United States Patent [19]

Leiber

[11] Patent Number: 4,557,528

[45] Date of Patent: Dec. 10, 1985

[54] HYDRAULIC VEHICLE BRAKE SYSTEM WITH BRAKE FORCE AMPLIFICATION AND ANTI-SKID REGULATION

[75] Inventor: Heinz Leiber, Oberriexingen, Fed. Rep. of Germany

[73] Assignee: Robert Bosch GmbH, Stuttgart, Fed. Rep. of Germany

[21] Appl. No.: 552,200

[22] Filed: Nov. 15, 1983

[30] Foreign Application Priority Data

Nov. 26, 1982 [DE] Fed. Rep. of Germany ....... 3243789
Mar. 9, 1983 [DE] Fed. Rep. of Germany ....... 3308281
Nov. 4, 1983 [DE] Fed. Rep. of Germany ....... 3339901

[51] Int. Cl.$^4$ .............................................. B60T 8/02
[52] U.S. Cl. ...................................... 303/92; 303/100; 303/114; 303/119
[58] Field of Search ................. 303/114, 113, 100, 92, 303/91, 10, 61–63, 68–69, 93, 94–99, 103, 106, 119, 20, 117; 188/345, 181 A, 181 R, 181 T, 181 C; 60/534, 548, 582, 581, 535, 538; 91/361

[56] References Cited

U.S. PATENT DOCUMENTS

4,143,514 3/1979 Leiber .................................. 303/114

Primary Examiner—Douglas C. Butler
Attorney, Agent, or Firm—Edwin E. Greigg

[57] ABSTRACT

The subject of the application is a hydraulic vehicle brake system with brake force amplification and anti-skid regulation by use of anti-skid regulating valves and having at least one closed brake circuit, the main brake cylinder piston of which is acted upon by a pilot pressure fed in by a brake valve. In addition, the anti-skid regulating valves are preceded by a valve assembly which upon the actuation of the anti-skid regulating valves disconnects the anti-skid regulating valves from the main brake cylinder and connects them to a pilot pressure. This switchover is effected in the presence of an anti-skid regulating signal and/or a redetermined deflection of the brake pedal of a main brake cylinder piston.

30 Claims, 8 Drawing Figures

HYDRAULIC VEHICLE BRAKE SYSTEM WITH BRAKE FORCE AMPLIFICATION AND ANTI-SKID REGULATION

BACKGROUND OF THE INVENTION

The invention relates to a hydraulic vehicle brake system as generally defined hereinafter.

A vehicle brake system of this kind is known, for instance from U.S. Pat. No. 3,706,479. There, the anti-skid regulating valve is disengaged from the man brake cylinder in the event of brake pressure regulation and connected for that purpose to a source of pressure comprising a pump and a reservoir. U.S. Pat. Nos. 3,756,660; 3,885,392; and 4,129,341 show well known wheel brake systems—with which the present invention can be used.

OBJECT AND SUMMARY OF THE INVENTION

The vehicle brake system according to the invention has the advantage over the prior art in that with conventional brake force amplifiers, in which a medium is used for the brake force amplification and for the brake circuit or circuits, it is possible to use relatively inexpensive anti-skid regulating valves. Furthermore, in the case of anti-skid regulation, a pedal characteristic is attained which is favorable in terms of human engineering.

Since after the switchover of the valve assembly the brake pedal becomes "hard", especially when the main brake cylinder is disengaged, the driver receives feedback, indicating for instance that the anti-skid regulator has responded.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
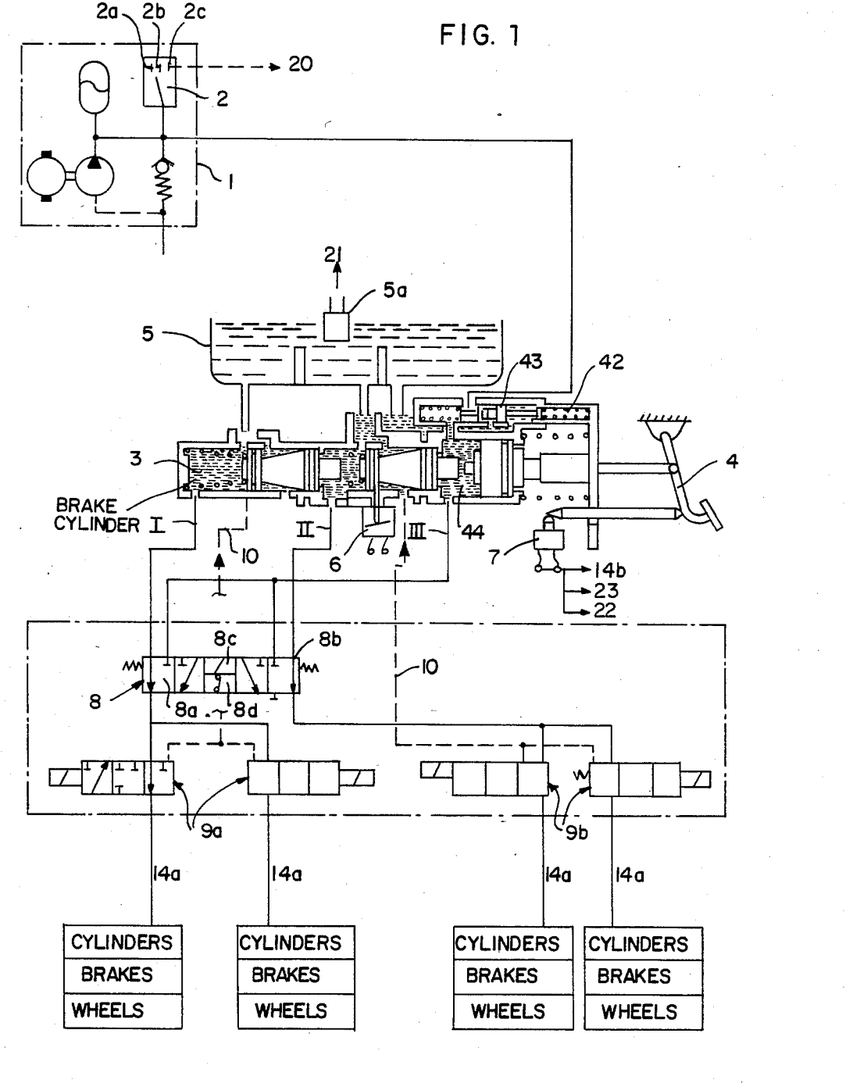
FIG. 1 shows a first possible structure for the hydraulic vehicle brake system according to the invention.
Figure 6:
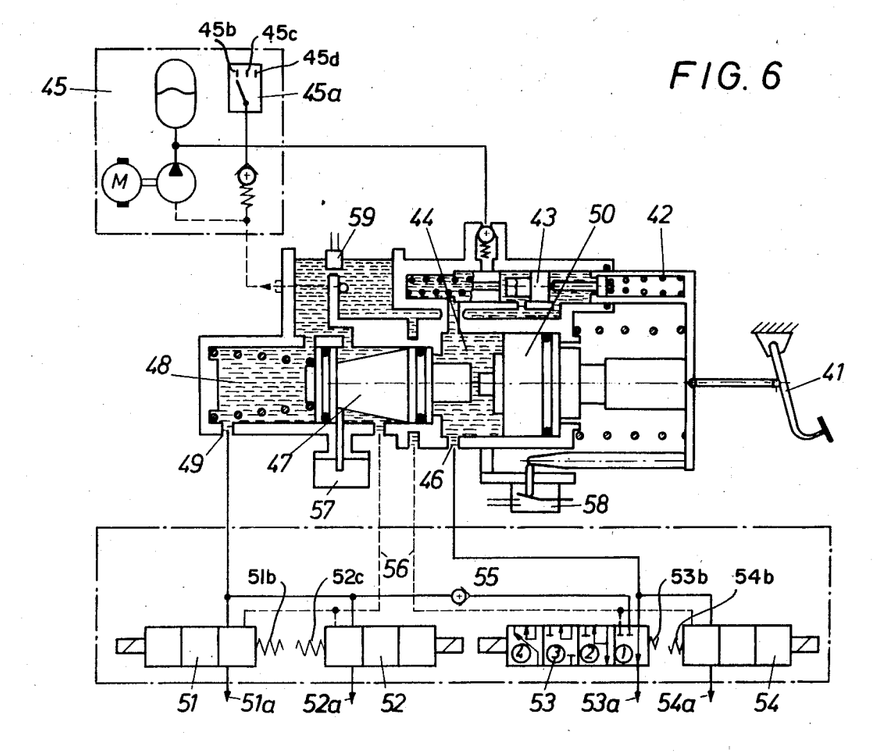
FIG. 6 shows a first exemplary embodiment, using a 4/4-way valve.

In FIG. 1, 1 indicates a pressure supply which includes a pressure switch 2, which has three different switching positions 2a–c. 3 is a known brake force amplifier or brake cylinder device, having two main brake cylinders, which experience the pressure generated via a brake pedal 4 and by means of a brake valve 43, FIG. 6 actuated thereby, this pressure being derived from the pressure of the pressure supply. When the driver actuates the pedal the brake valve 43 is moved via the travel simulator 42 so that pressure proportional to the pedal force is fed to control chamber 44. The outputs of the two main brake cylinders are marked I and II; a line leading out of the control chamber for the main brake cylinder having the output II is marked III. Such a three pressure line brake cylinder is shown in the prior art by British Pat. No. 2,086,506A. Thus the pressure generated by means of the brake valve is present at the output III. A supply container with brake fluid is marked 5. In the outset position of the piston of the main brake cylinder, this supply container 5 communicates with the cylinders, and if the brake valve is not actuated it also communicates with the control chamber. Via a switch 6, which is actuated in the same manner as switch 57 in FIG. 6 and has contacts like switch 58 an indication is given when the piston belonging to output I is highly deflected due to movement of piston 47. It responds in the event of the failure of the brake circuit connected at I. By means of the switch 7, a signal is generated whenever the brake pedal 4 or the piston belonging to circuit II is deflected by a predetermined distance (for instance, 50%). Prior art patent U.S. Pat. No. 4,489,555 illustrate switches such as switches 6 and 7.

Connected to the outputs or brake circuits I and II there is a double valve 8, which comprises two three-way valves 8a and 8b incorporated into circuits I and II, respectively, as well as an actuation magnet 8c common to both. When the coil of magnet 8c is energized an armature common to both valve parts 8a and 8b is moved to switch valve parts 8a and 8b. In the position of rest, shown, these valves 8a and 8b connect the outputs I and II with anti-skid regulating valves 9a and 9b, which are shown here as three-stage valves. Upon the actuation of these valves 8a and 8b by means of the actuation magnet 8c, in contrast, output III is connected with the anti-skid regulating valves 9a and 9b via valves 8a and 8b. The actuation magnet 8c is also assigned a switch 8d, which in the position of rest emits a signal but does not generate an output signal after the actuation of the magnet 8c because the switch 8d is turned off by actuation of magnet 8c.

Return flow lines 10 connected to the valves 9a and 9b and to the brake force amplifier are also shown in the drawing, indicated by dashed lines.

It is possible for the double valve 8 to be replaced by two independent 3/2-way valves, which are then triggered in parallel. Each of the independent 3/2-way valves would have its own armature for actuation of the valves. 3/2 way valves and 4/4 way valves are well known in the prior art.

Figure 2:
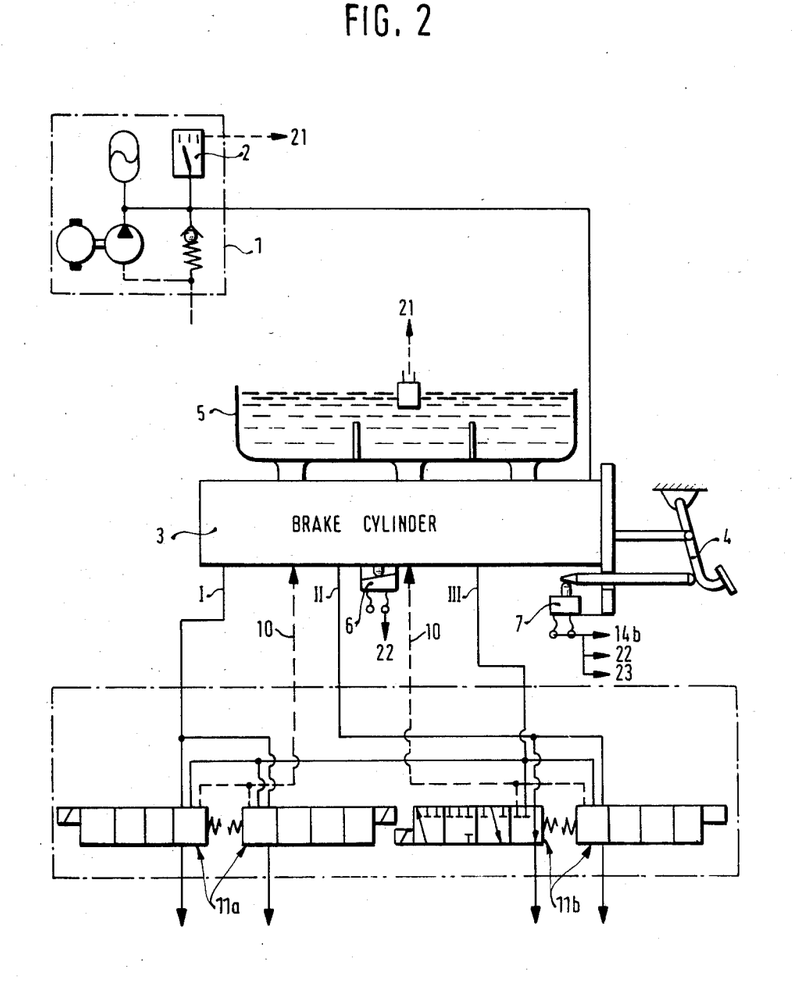
FIG. 2 shows a second possible structure for this system.

FIG. 2 differs from FIG. 1 solely in that the double valve 8 is integrated into the anti-skid regulating valves 11a and 11b, which are now embodied as 4/4-way valves. In the outset position of the valves 11a and 11b, the brake cylinders are once again connected with the main brake cylinders; in the second position, they are connected with output III; in the third position there is no connection (maintenance phase); and in the fourth position the brake cylinders are connected with the return flow lines 10. The triggering of the second position thus corresponds with the triggering of the double valve 8 of FIG. 1, because in both cases the brake cylinders are connected to output III.

Figure 3:
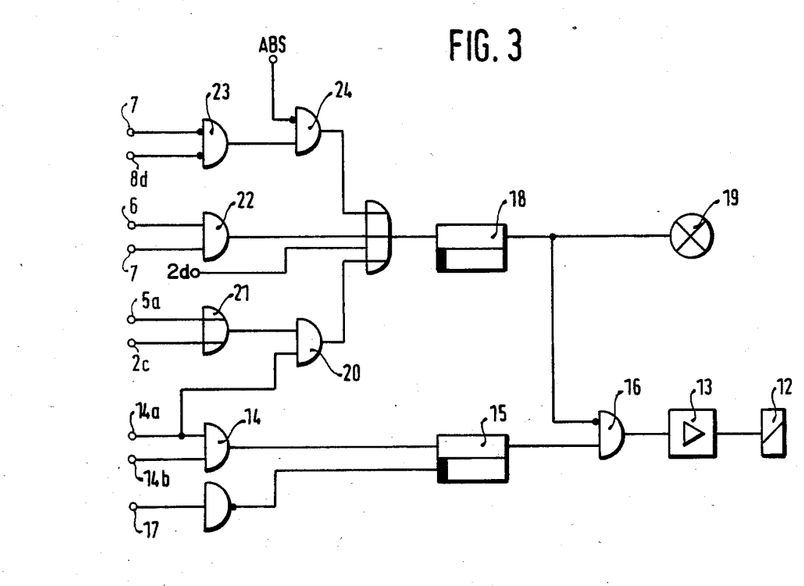
FIG. 3 shows a trigger circuit for the additional valve assembly.

A trigger circuit for the double valve 8 of FIG. 1 or of the separate valves with their own armatures which are also possible is shown in FIG. 3. The actuation magnet of this valve is indicated at 12 in FIG. 3, magnet 12 of FIG. 3 is identical to magnet 8c of FIG. 1 and a preceding amplifier is indicated at 13. In the example of FIG. 3, a triggering of the magnet 12 occurs if an AND gate 14 emits an output signal and thus sets a bistable element 15 into its second position, and an AND gate 16 is not blocked by a blocking signal indicating e.g. deficiency of the brake fluid or failure to attain a minimum accumulator pressure. The output signal of the AND gate 14 is produced if a signal triggering an anti-skid regulating valve 9 caused by the detection of a locking tendency of the respective wheel appears at the terminal 14a and if simultaneously it is indicated at the terminal 14b by means of the output signal of the switch 7 that the pedal 4 has been deflected by a predetermined distance which is common with normal braking. The bistable element 15 is reset whenever the signal of the switch 7 disappears once again, or—as shown in FIG. 3—if the signal at the terminal 17 ends upon the attainment by the pedal of its position of rest.

In the apparatus discussed thus far, the valve 8 is triggered as soon as a tendency toward skidding appears, and it is not reset until the braking operation has ended. The result during this period of time is an application onto the valves 9 of the pressure that is dependent upon the pedal actuation.

If the valve 8 is integrated into the anti-skid regulating valves 11 as in FIG. 2, the output signal of the AND gate 16 would be dimensioned by way of example such that the valves 11 in response to this signal proceed directly to their second position, while larger signals are required for attaining the other positions.

The further circuit elements of FIG. 3 serve to prevent or interrupt the triggering of the magnet 12 whenever certain critical states occur e.g. deficiency of brake fluid or failure to attain a minimum accumulator pressure. In the exemplary embodiment, a bistable element 18 is set with the aid of signals indicating such situations, and this element then blocks the AND gate 16 and turns on a warning light 19. The bistable element is preferably resettable only from outside, for instance by customer service personnel.

Three cases capable of generating such signals are illustrated here. First, an AND gate 20, which on the one hand receives the regulating signal of the terminal 14a and on the other hand receives signals via an OR gate 21, whenever either the pressure-level switch 5a indicates a deficiency of brake fluid or the pressure switch 2, via position 2c, indicates the failure to attain a minimum pressure. A further withdrawal of brake fluid for the purpose of brake pressure regulation cannot be allowed then. Second, by means of the AND gate 22, which is connected to switches 6 and 7, the failure of a circuit is recognized and the blockage then likewise performed. Finally, with the AND gate 23 having inverted inputs, which is connected to switch 7 and switch 8d, an output signal is generated whenever in the event of insufficient deflection of the pedal 4 or the corresponding piston—that is, in the event of a zero signal on the part of the switch 7—the absence of the signal of the switch 8d indicates the actuation of the valve 8. If this should happen without an anti-skid signal blocking an AND gate 24, then the result is again the blockage of the AND gate 16.

Figure 4:
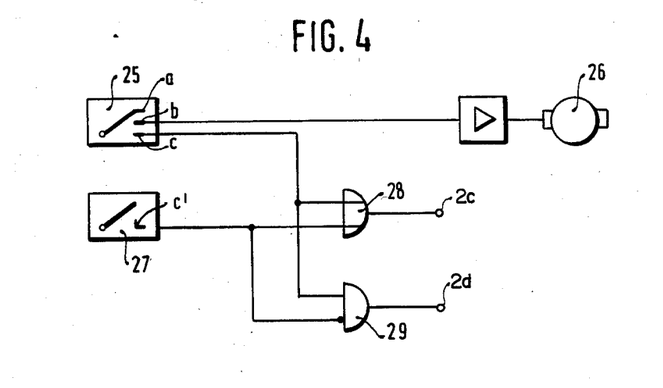
FIG. 4 shows a possible augmentation of the circuit of FIG. 3.

In FIG. 4, the accumulator pressure switch is embodied redundantly, which is appropriate when the invention is used. The switch 25 having the three switching positions a–c corresponds to the switch 2 of FIG. 1. In position a, the supply of pressure medium by the pressure medium pump is shut off. In position b, the motor 26 of the pump is put into operation, and in position c, in which the motor is likewise supposed to be operating, a warning signal, "insufficient pressure", is produced. A second pressure switch 27 has at least one contact c', which is closed at a somewhat higher pressure than that for contact c. The output signal 2c of the OR gate 28 here generates the signal to be delivered to the AND gate 20 via the OR gate 21. The output signal 2d of an AND gate 29, which appears if upon the closure of contact c, contact c' still has not yet closed, is likewise capable of blocking the bistable element 18.

Figure 5:
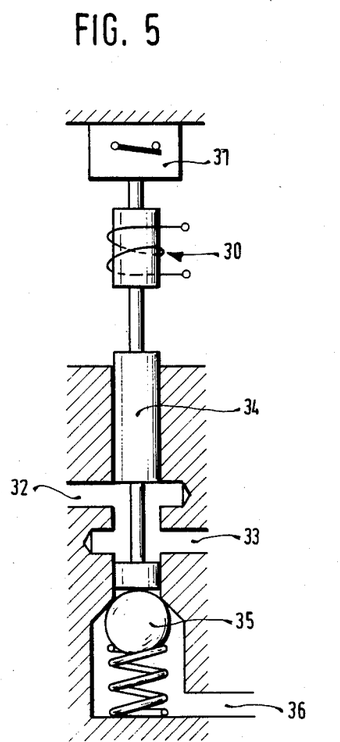
FIG. 5 shows a valve of a kind preferably used as the switchover valve in the invention.

In FIG. 5, a spool valve is shown such as can preferably be used in the invention for disengaging one main brake cylinder and connecting output III i.e. FIG. 5 illustrates a technical solution of valve 8 in FIG. 1. The electromagnet is indicated at 30, while the actuation switch corresponding to switch 8d is indicated at 31. In the illustrated position, the connection 32 connected to one main brake cylinder corresponding to line I of FIG. 1 and the connection 33 connected to the anti-skid valves 9a of FIG. 1 are connected with one another. In the second position spool 34 has moved downward, so that, the connection 32 is disconnected by the spool 34; the ball 35 is disengaged from its seat, and communication is established between the connections 33 and 36, with the pressure directed into the system by the brake valve being present at 36 which corresponds to line III of FIG. 1.

In FIG. 6, a brake pedal 41 is shown, which via a travel simulator 42 actuates a brake valve 43. The travel simulator enables the pedal to be moved and to exert a force on the brake valve proportional to the pedal force. With this brake valve 43, a control pressure is established in a control chamber 44, with the aid of a pressure source 45, which on the one hand acts as the brake pressure for the wheel brake cylinder connected to an outlet 46 and on the other hand acts upon a piston 47 of a main brake cylinder 48, to the outlet 49 of which further wheel brake cylinders are connected. The pressure established has a feedback effect via a piston 50 upon the pedal 41. If the pressure source 45 fails, this piston 50 likewise acts as the main brake cylinder. Of the four brake pressure control valves 51–54, two each are connected to the two outlets 46 and 49, and the outlets 51a–54a of these valves 51–54 lead to the individual wheel brake cylinders. They serve to modulate the brake pressure upon a tendency toward wheel locking or skidding. In the present case, all four valves 51–54 are multiple-position valves. The valves 51, 52 and 54 are three-position valves, which in their three positions and in a known manner enable a brake pressure buildup, maintaining a constant brake pressure, and a pressure reduction via the return flow lines 56 indicated by dashed lines. They are triggered by a trigger circuit, not shown, in the manner of an anti-skid regulating system.

The valve 53, by contrast, is a four-position valve (4/4-way valve), which in its outset position (position 1) makes the outlet 46 of the chamber 44 communicate with the wheel brake cylinder connected to it. This valve assumes not only the function of the anti-skid control valve but also the function of the additional valve 8 of FIG. 1. To this end, not only is an additional position (position 2) provided, in which the control pressure remains applied to the outlet 53a; but in addition, the inputs of the valves 51 and 52 are also, in this position, connected via a check valve 55 to the control pressure. In the second, third and fourth position of valve 53 the checkvalve 55 allows flow from valve 53 to valves 51 and 52, but not vice-versa. The input of the valve 54 is permanently connected with this control pressure. In positions 3 and 4, which enable keeping the pressure constant or reducing the pressure, respectively, in the wheel brake cylinder connected at 53a, the communication between the outlet 46 and the inputs of the valves 51 and 52 is maintained.

It is thereby attained that any consumption of brake fluid by means of the pressure reduction phases has no effect on the charge in the main brake cylinder 48.

In FIG. 6, switches 57 and 58 are also provided for monitoring the deflection of the pistons 47 or of the brake pedal 41, the switch 58 being embodied as a double-throw switch. A double-throw switch 45a which has switching positions 45b, 45c, 45d for monitoring the pressure of the pressure source 45 and a sensor 59 for monitoring the charge level of the supply container are also provided. The function of these switches and sensor will be explained in connection with the circuits of FIGS. 7 and 8.

Figure 7:
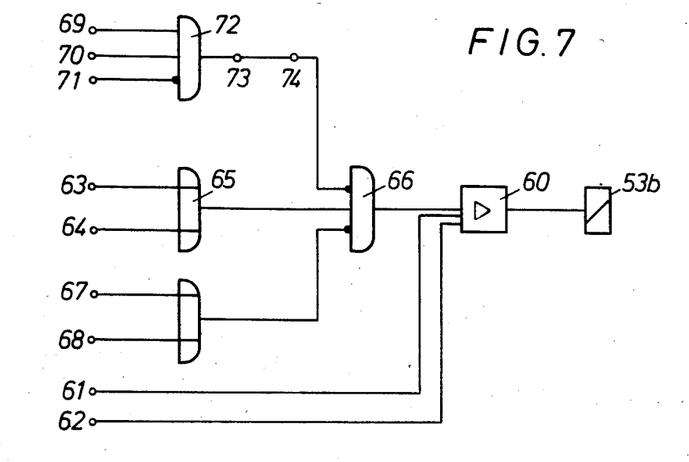
FIG. 7 shows a trigger circuit for the multiple-position valve of FIG. 6.

In FIG. 7, the electromagnet of the valve 53 is indicated as element 53b; it is triggered via the amplifier 60. Trigger signals of various power are supplied to the three inputs of the amplifier 60, and in cooperation with springs in the valves as shown in FIG. 6 under 51b, 52b, 53b, 54b these signals cause the movable valve element to assume various positions. The different power levels can be attained either by means of different triggering currents 0, 1.5, 3.0 and 5.0 Amperes levels, e.g. or by means of differently clocked triggering currents.

Via the terminals 61 and 62, representing e.g. 3.0 and 5.0 amperes current the valve is supposed to be moved into positions 3 and 4. Directing the valve into position 2, by contrast, is effected via the terminals 63 or 64; of 1.5 ampere current a signal is supplied to the terminal 63 whenever and as long as an anti-skid regulating process is occurring, and the terminal 64 receives a signal whenever the switch 57 in FIG. 6 closes that is, whenever the main brake cylinder piston 47 has reached a distance typical for a full power braking brake. By directing the valve 53 into position 2 brake fluid is fed from control chamber 44 via the check valve 55 to the antiskid regulating valves 51, 52 and to the main brake cylinder 48 which feeding to the main brake cylinder causes the main brake cylinder piston 47 to rest in its position. When pressure in the control chamber 44 is further increased by pressing the pedal 41 pressure will be also increased in the main brake cylinder 48, but the main brake cylinder piston will still rest in its position. It is important that the piston rests in the position so that in case of a failure of the pressure supply during antiskid operation on a road with low friction coefficient, e.g., glaze ice, the piston can make a sufficient residual travel to increase the main brake cylinder pressure when the vehicle makes a transition to a road with a high friction coefficient, e.g., dry concrete, where a higher brake pressure is required. Triggering by means of one of these signals is effected via OR gates 65 65a and an AND gate 66. By means of the AND gate 66, the triggering can be blocked either whenever the sensor 59 indicates that the level of the brake fluid in the reservoir has dropped below a specified level (terminal 67) or whenever the switch 45a indicates that the pressure of the pressure source has dropped below a certain level (terminal 68) which terminals 67, 68 block the AND gate 66 via the OR gate 65a. Furthermore, the AND gate is blocked if the brake circuit connected to the main brake cylinder has failed. This is detected here by means of the switches 57 and 58, and in fact the blockage takes place whenever the switch 57 (terminal 64) and the first stage of the switch 58 (terminal 70) have responded but the second stage of the switch 58 (terminal 71) has not.

Switch 57 responds if piston 47 travels forward to a position which is typically attained with a drastic braking action, e.g. 80 bar, with the brake circuits intact. The first stage of switch 58 responds if pedal 41 makes a small movement which only suffices to generate a small pressure, e.g. 5 bar, in the control chamber 44. The second stage of switch 58 responds when the pedal is moved forward to a medium position typical for normal braking, e.g. 40 bar.

If by pressing the pedal the driver generates a pressure greater than 5 bar but smaller than 40 bar the first stage of switch 58 will respond but its second stage will not respond. At the same time switch 57 will not respond if the brake circuit connected to main brake cylinder 48 is intact, but will respond if this braking circuit has failed. This synchronous responding of switch 57 and not responding of the second stage of switch 58 is an indication that the brake circuit connected to main brake cylinder 48 has failed.

Figure 8:
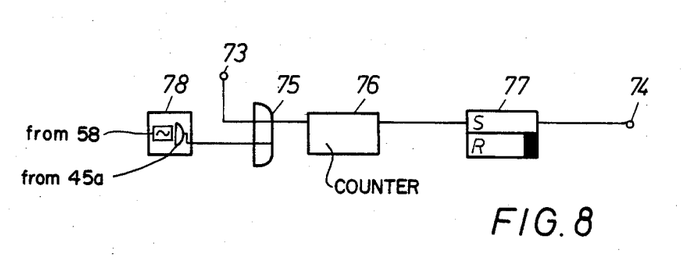
FIG. 8 shows a possible way to extend the embodiment of FIG. 7.

In the event of a repeated occurrence of a signal indicating the failure of one brake circuit, it is possible in order to guarantee that the AND gate 66 will be blocked until a repair is made to insert the circuit shown in FIG. 8 between terminals 73 and 74; in this circuit, these failure signals are supplied to a counter 76 via an OR gate 75. At a predetermined counting position, this counter sets a non-volatile memory 77, which then takes on the function of long-term blockage. The same blockage can also be undertaken if it is detected in a block 78, which cooperates with the multiple switch 45a, that the pressure of the pressure source is dropping more rapidly than with a prespecified gradient given by normal braking action. Outputs of switch 58 shown in FIG. 6 and of switch 45 as shown in FIG. 6 are compared in comparator 78 which emits a signal in case the pressure of the pressure source is dropping more rapidly than with the prespecified gradient given by normal braking action.

The comparater 78, for example, includes a single shot element 78a connected to the switch 58 and an AND gate 78b connected to the single shot element 78a and to the switch 45a. When the brake pedal 4 is actuated then for a time period of a preselected duration the single shot element 78a gives a signal to one input of the AND gate 78b. If the pressure in the pressure source 45 falls below a preselected threshold the switch 45a gives a signal to the second input of the AND gate 78b. The AND gate 78b compares the status of the second input with the status of the first input. If at the same time occur two signals the comparator 78 generates a blocking signal.

It has been said above that the signal at the output of the AND gate 65 is present during the entire regulating process. The signals of the terminals 61 and 62 are superimposed upon this signal.

In the exemplary embodiment of FIG. 6, the multiple-position valve 53 is embodied with a dual function in the form of a four-position valve. "Dual function" means that fluid from chamber 44 is fed to line 53a and in check valve 55 to valves 51 and 52 on the one hand and that pressure in the wheel brake line 53a is increased, held constant or decreased (position 2, 3 or 4) during anti-skid operation. In its function as a modulation valve, this enables the same pressure states as the other valves 51, 52 and 54. If the pressure state of "keeping pressure constant" is dispensed with, that is, if position 43 is omitted in the valve but the other positions are left as in valve 53, then this valve too can be embodied as a three-position valve.

The apparatus shown in FIGS. 6-8 may be used whenever only one main brake cylinder is used and in the other brake circuit the established pressure (pilot pressure generated by brake valve 43) is used as the brake pressure, but it can also be used whenever two (or more) main brake cylinders are provided, to which the brake circuits are connected and the pistons of which are actuated by the pressure (pilot pressure) established by means of the brake valve.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A hydraulic brake system providing brake force amplification and anti-skid regulation for wheel brake cylinders of wheel brakes at each wheel of a vehicle, comprising:
   at least one closed brake circuit having a main brake cylinder means, a fluid pressure source therefor providing a braking pressure fluid, a pilot fluid pressure derived from the fluid pressure of said fluid pressure source, and a pedal-actuated member for controlling said pilot fluid pressure,
   at least one anti-skid regulating valve means connected between said main brake cylinder means and said wheel brake cylinders of the wheels of said vehicle for regulating the braking fluid pressure during braking and upon a tendency to skidding of the wheels of said vehicle,
   a valve assembly means for selectively providing said pilot fluid pressure as a different fluid pressure source effective for said anti-skid regulating valve means, and
   triggering means for actuating said valve assembly means at least during anti-skid regulation.

2. A vehicle brake system according to claim 1, wherein said triggering means actuates said valve assembly means in response to a predetermined deflection of a piston in said main brake cylinder means.

3. A vehicle brake system as defined by claim 2, wherein said triggering means of said valve assembly means comprises a bistable circuit responsive to a signal generating means generated upon the attainment of said predetermined deflection for actuating said valve assembly means.

4. A vehicle brake system as defined by claim 3, wherein a resetting means for said bistable element is effected upon the attainment of a position of rest of said pedal-actuated member.

5. A vehicle brake system according to claim 1, wherein said triggering means actuates said valve assembly means upon the occurrence of a first anti-skid braking system signal.

6. A vehicle brake system as defined by claim 1, wherein said triggering means of said valve assembly means comprises a blocking circuit, which upon recognition of a failure of said at least one brake circuit blocks said triggering means.

7. A vehicle brake system as defined by claim 6, wherein said triggering means for said blocking circuit comprises a bistable element triggerable by means of a blocking signal and is manually resettable.

8. A vehicle brake system as defined by claim 1, wherein said triggering means of said valve assembly means comprises a blocking circuit for blocking said triggering means in response to a pressure valve switching means for said pressure source.

9. A vehicle brake system as defined by claim 1, wherein said triggering means of said valve assembly means comprises a blocking circuit for blocking said triggering means in response to a level sensing switch for the pressure medium in said pressure source.

10. A vehicle brake system as defined by claim 1, wherein said valve assembly means includes a switch means actuated with said valve assembly means actuation, and said triggering means comprises a blocking circuit for blocking said triggering means whenever upon a non-deflection of said pedal-actuated member, said switch means signals an actuation of said valve assembly means.

11. A vehicle brake system as defined by claim 1, wherein said valve assembly means when responding additionally disconnects pressure fluid flow from said main brake cylinder from said at least one anti-skid regulating valve means.

12. A vehicle brake system as defined by claim 1, wherein said valve assembly means comprises one 3/2-way valve per said at least one brake circuit.

13. A vehicle brake system as defined by claim 12, wherein said valve assembly means comprises a spool valve means.

14. A vehicle brake system as defined by claim 1, wherein said valve assembly means comprises two 3/2-way valves and a common electromagnet connected therebetween.

15. A vehicle brake system as defined by claim 14, wherein said valve assembly means comprises a spool valve means.

16. A vehicle brake system as defined by claim 1, wherein said valve assembly means is integrated into said anti-skid regulating valve means by an additional position and one further connection.

17. A vehicle brake system as defined by claim 16, wherein said valve assembly means comprises a spool valve means.

18. A vehicle brake system as defined by claim 1, wherein two brake circuits are provided and said valve assembly means applies said pilot fluid pressure, in addition to said pressure of fluid main brake cylinder means, to said anti-skid regulating valve means.

19. A vehicle brake system as defined by claim 18, wherein said valve assembly means comprises brake pressure control valves, one of said valves having an additional switching position constructed and connected such that in a first position assumed without anti-skid regulation taking place, said one valve subjects the wheel brake cylinder connected thereto to the associated brake pressure; in a second position said one valve applies said pilot pressure to the wheel brakes connected thereto and to the inputs of the other of said brake pressure control valves; and in a third position said one valve applies said pilot pressure to the other of said brake pressure control valves and connects the wheel brakes connected thereto with an outlet opening for the purpose of reducing pressure.

20. A vehicle brake system as defined by claim 18, wherein said one valve having the additional switching position has a fourth position, which upon applying said pilot fluid pressure to the other of said brake pressure control valves effects the maintenance of a constant pressure at the wheel brake cylinders connected thereto.

21. A vehicle brake system as defined by claim 18, wherein during braking without anti-skid regulation, said pressure serves as the brake pressure for said one brake circuit.

22. A vehicle brake system as defined by claim 18, wherein said one valve having the additional switching position comprises an electromagnet and is directable into various positions by means of different triggering powers.

23. A vehicle brake system as defined by claim 18, wherein said one valve having the additional switching position is additionally directable into said second position whenever an excessive deflection of the piston within said main brake cylinder means is detected via a sensor.

24. A vehicle brake system as defined by claim 18, wherein the triggering of said one valve having the additional switching position into said second position is blocking by means of a blocking circuit, whenever sensor means signal excessive deflection of the piston within said main brake cylinder means without a corresponding deflection of the pedal of said cylinder means thereby signalling a failure of the first brake circuit.

25. A vehicle brake system as defined by claim 24, wherein said blocking circuit includes a counter and a non-volatile memory, and said counter sets said memory at a prespecified number of signalled failures of the first of said two brake circuits, and said memory effect the blocking function.

26. A vehicle brake system as defined in claim 25, wherein the trigger signal for the blockage is delivered to said counter.

27. A vehicle brake system as defined by claim 18, wherein the triggering of said one valve having the additional switching position into said second position is blockable by means of a blocking circuit whenever the pressure of said pressure source from which a control pressure is derived by means of a brake valve drops below a prespecified value.

28. A vehicle brake system as defined by claim 27, wherein sensors are provided which monitor the gradients of the drop in the pressure of said pressure source serving to generate said control pressure and upon an overly rapid pressure drop generate a trigger signal for blocking the triggering of said one valve having the additional switching position into the second position.

29. A vehicle brake system as defined by claim 28, wherein the trigger signal for the blockage is delivered to said counter.

30. A vehicle brake system as defined by claim 18, wherein the triggering of said one valve having the additional switching position into the second position is blockable by means of a blocking circuit whenever the supply of brake fluid drops below a prespecified value.

* * * * *